Figure 1:
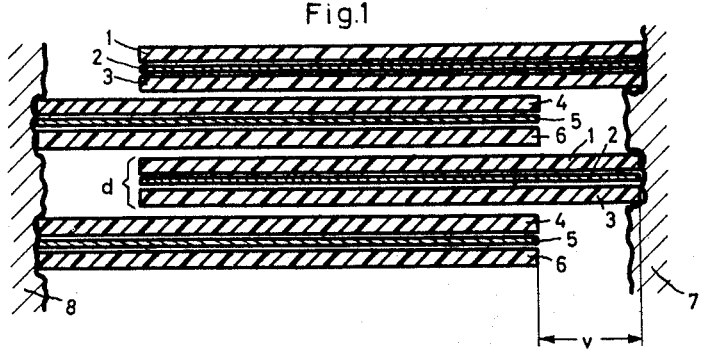

United States Patent Office 3,248,620
Patented Apr. 26, 1966

3,248,620
ELECTRICAL CAPACITOR WITH CO-EXTENSIVE FOIL LAYERS
Roland Haft, Heinrich Hauerwaas, Gerhard Mayer, and Hermann Schill, Munich, Germany, assignors to Siemens & Halske Aktiengesellschaft, Berlin and Munich, Germany, a corporation of Germany
Filed Sept. 19, 1963, Ser. No. 310,172
Claims priority, application Germany, Sept. 21, 1962, S 81,584
5 Claims. (Cl. 317—261)

The invention disclosed herein is concerned with an electrical capacitor, preferably a wrapped capacitor, which is constructed with the aid of three-layer foils, comprising a metal layer embedded between two varnish layers, the embedded metal layer forming the coatings or plates. This is effected by arranging three-layer foils so as to be mutually laterally displaced and by providing contact layers at the ends for contacting the coatings.

In the manufacture of electrical capacitors having coatings formed upon insulating bands by metal layers which are, for example, vaporized thereon in a vacuum, there are used suitable covering means such as templates, masks or oil film means for leaving marginal areas or zones of the insulating bands free of metal layers. It is also known to metallize the insulating bands over the whole width thereof and to subsequently remove the metal along the margin by burning it off with the aid of an arc. The margin left free of metal is intended, on the one hand, to prevent, upon contacting of the coatings by spraying metal thereon, short circuits with the oppositely poled coating and, on the other hand, to prevent shunts at the edge of the foil. This measure which is necessary to assure sufficient insulation naturally decreases the capacitively active part of the capacitor volume.

It was, however, surprisingly found, in connection with electrical capacitors having a dielectric with a thickness amounting to less than $6\mu$ and constructed of three-layer foils in the previously indicated manner, that this measure can be dispensed with without causing any detrimental effects.

It is therefore in accordance with the invention proposed to provide the metal layers in the three-layer foils on both sides up to the edge of the insulating strip without leaving free a marginal zone.

This results in several advantages. The operation having to do with the covering up of the marginal zone incident to the metallizing or having to do with the subsequent removal of the marginal metal layer, can be dispensed with. The capacity per volume unit is considerably increased as compared with capacitors provided with a margin which is free of coating. For example, in the case of a thin-foil capacitor with a capacity of $0.1\mu f.$, there was obtained an increase of volume capacity amounting to 45 percent. Moreover, the capacity constancy is improved. This is due to the fact that the edge of the metal coating can never be completely sharp, in the formation of a margin which is held free of coating with the use of a covering or upon subsequent burning off, thereby producing a given capacitance constancy. This effect is avoided upon metallizing the entire area.

It is above all surprising that the capacitors made in accordance with the invention do not exhibit the disadvantages which would appear in the case of capacitors of customary construction, upon extending the metallizing to the edge instead of leaving a marginal zone free of metal. As mentioned before, these disadvantages reside in the danger of formation of short circuits upon contacting the coatings or in the danger of marginal shunts. The danger of forming short circuits upon contacting does not appear in the case of a capacitor according to the invention, because ingress of metal particles which are large as compared with the thickness of the dielectric, amounting to less than $6\mu$, is prevented upon the spraying of contacting metal on the laterally displaced foils.

It may be mentioned at this point that it is customary in the production of customary capacitors with coatings vaporized on insulating bands, to mutually displace the bands carrying coatings of opposite polarities; however, considering the fact that the dielectric layers are of greater thickness, the displaced arrangement does not provide a reliable protection against the ingress of metal particles incident to spraying the contact metal, and therefore cannot prevent the formation of short circuiting bridges.

The appearance of direct edge shunts is in the capacitor according to the invention prevented by the use of three-layer foils in which the metal layers are respectively embedded between two insulating layers. In connection with a single-layer capacitor, in which the coatings are disposed upon the surface of the insulating bands, there is always the danger of formation of a breakdown to a neighboring coating, since only one surface path of the thickness of the dielectric has to be overcome; this is not the case in a capacitor according to the invention, in which the coatings are respectively embedded between two dielectric layers, wherein one of these dielectric layers must be passed incident to each breakdown.

The capacitor is advantageously impregnated at least along the marginal zone, so as to avoid the danger of formation of marginal shunts and the formation of glow discharges upon using a capacitor in alternating current operation.

Further details and features will be brought out in the appended claims and in the description which is rendered below with reference to the accompanying drawing.

Figure 2:
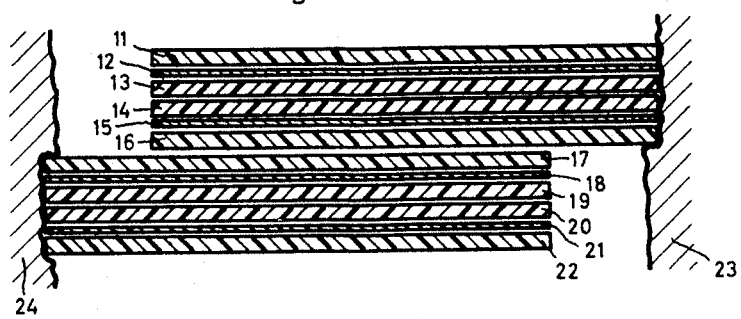

FIG. 1 shows in schematic sectional view a few layers of an embodiment of an electrical capacitor according to the invention; and FIG. 2 shows in similar representation another embodiment.

The capacitor according to FIG. 1 is constructed of three-layer foils, the foils of one polarity comprising dielectric layers 1 and 3 between which is embedded a metal coating 2, such coating being of the same width as the dielectric layers, that is, there is no marginal zone of the dielectric which is free of metal. The metal layer 5 of the opposite polarity is embedded between dielectric layers 4 and 6. The metal layer 5 is likewise as wide as the corresponding dielectric layers, no marginal zone of the dielectric layers being free of the metal layer 5. The metal layers 5 and 2 are respectively contacted by contact metal layers 8 and 7 which are sprayed on the structure at the opposite ends thereof. A three-layer foil, such as the foil comprising the dielectric layers 4 and 6 and the metal coating 5, or the foil comprising the dielectric layers 1 and 3 and the metal coating 2, is so thin that upon spraying contact metal 7 and 8 on the ends of the structure, ingress of contact metal particles to the respective coatings or plates of opposite polarity (metal layers 5 and 2), is prevented by the lateral displacement of the respective three-layer foils. The danger of such ingress of metal particles to the respective coatings or plates is reliably avoided by making the spacing $v$ relatively great as compared with the thickness $d$ of a three-layer foil. This condition is invariably present in the case of so-called thin-foil capacitors in which $d$ is smaller than $6\mu$ while the lateral displacement $v$ amounts as a rule to about 1 millimeter.

The invention has proved particularly advantageous in connection with so-called thin-foil capacitors which are produced by placing upon a suitable carrier or support, for example, a paper band impregnated with high melting hydrocarbon substances, if desired with an addition of cementing means, a first varnish layer, preferably of cellulose acetate, vaporizing on the first varnish layer a metal coating, preferably aluminum, and thereupon placing on the metal coating a second varnish layer, for example, likewise of cellulose acetate or of polystyrol. The varnish and metal layers thus formed are with the carrier or support subjected to drying, thereafter cut to the desired size and directly processed to form capacitors, during which processing such layers are separated from the carrier.

The invention was found to be particularly advantageous in connection with capacitors of the kind shown in part in FIG. 2, wherein advantages of different dielectric materials are utilized.

The capacitor shown in FIG. 2 is constructed with the aid of thin-foil bands comprising first varnish layers indicated by numerals 13, 14, 19, 20, preferably of cellulose acetate which has good regenerative properties, metal coatings indicated by numerals 12, 14, 18, 21, preferably of aluminum, upon which are disposed dielectric layers, preferably of polystyrol which has good dielectric properties, indicated by numerals 11, 16, 17, 22. Four such bands are so stapled together or wrapped by winding and contacted, that the first varnish layers 13, 14, 19 and 20 are in the field-free space while only the second varnish layers 11, 16, 17 and 22 are dielectrically active. The three-layer foils 11, 12, 13 and 14, 15, 16, 17 are laterally displaced with respect to the three-layer foils 17, 18, 19 and 20, 21, 22. The coatings 12 and 15 are contacted at one end of the capacitor by the contact layer 23 and the coatings 18 and 21 are similarly contacted at the other end of the capacitor, by the contact layer 24. The width of the metal coatings 12, 15, 18 and 21 corresponds in this structure likewise to the width of the dielectric layers without leaving on the latter a marginal zone which is free of the metal coating.

Changes may be made within the scope and spirit of the appended claims which define what is believed to be new and desired to have protected by Letters Patent.

We claim:
1. An electrical capacitor, comprising a plurality of assembled foils, forming respective sides of the capacitor of opposite polarity, each of such foils having at least three layers comprising two varnish dielectric layers and an intermediate metal layer, which layers are coextensive in width, with the respective foils of one polarity being disposed between the foils of opposite polarity and laterally displaced with respect thereto, the depth of such displacement being greater than the combined thickness of the two varnish layers and intermediate metal layers of the respective foils, and a metal contacting layer disposed at the exposed displaced edges of like foils of each polarity extending beyond displaced edges of intermediate foils therebetween and respectively connecting only the metal layers of foil edges of like polarity.

2. An electrical capacitor according to claim 1, wherein said foils have a thickness of less than 6 microns and the metal particles of said contacting layer are greater in size than the width of marginal zones between exposed foils of like polarity.

3. An electrical capacitor according to claim 1, comprising an impregnating agent disposed at least in the marginal zones between exposed foils of like polarity.

4. An electrical capacitor according to claim 1, wherein each foil comprises two dielectric layers and an intermediate metal layer, one of said dielectric layers being of a material having relatively good dielectric properties and relatively poor regenerative properties, and the other of said layers being of a material having relatively poor dielectric properties and relatively good regenerative properties, said foils being disposed in pairs with all layers of a pair extending coextensively in width, and the dielectric layers with good regenerative properties being disposed in opposed relation, each of such foil pairs being displaced with respect to the adjacent foil pairs, said dielectric layers with good regenerative properties being disposed between metal layers connected by the associated metal contacting layers and thus in the field-space formed thereby, and said dielectric layers with good dielectric properties being disposed between metal layers of opposite polarity.

5. An electrical capacitor according to claim 4, wherein said foil points have a thickness of less than 6 microns and the metal particles of said contacting layer are greater in size than the width of marginal zones between exposed foils of like polarity.

References Cited by the Examiner

UNITED STATES PATENTS

| 2,619,443 | 11/1952 | Robinson | 317—258 X |
| 2,749,490 | 6/1956 | Robinson | 317—258 |
| 3,016,481 | 1/1962 | Simpson | 317—258 |

FOREIGN PATENTS 162,504   3/1949   Austria.

JOHN F. BURNS, *Primary Examiner.*